(12) United States Patent
Slevin-Giesler

(10) Patent No.: US 10,334,973 B2
(45) Date of Patent: Jul. 2, 2019

(54) ADJUSTABLE AND MOUNTABLE GALLERY DEVICE

(71) Applicant: ABK Innovations LLC, Galena, OH (US)

(72) Inventor: Kristi Slevin-Giesler, Galena, OH (US)

(73) Assignee: ABK INNOVATIONS LLC, Galena, OH (US)

( * ) Notice: Subject to any disclaimer, the term of this patent is extended or adjusted under 35 U.S.C. 154(b) by 0 days.

(21) Appl. No.: 16/002,008

(22) Filed: Jun. 7, 2018

(65) Prior Publication Data

US 2018/0352978 A1  Dec. 13, 2018

Related U.S. Application Data

(60) Provisional application No. 62/516,944, filed on Jun. 8, 2017.

(51) Int. Cl.
| | |
|---|---|
| *A47G 1/16* | (2006.01) |
| *F16B 2/12* | (2006.01) |
| *A47B 43/00* | (2006.01) |
| *A47B 96/14* | (2006.01) |
| *A47G 29/08* | (2006.01) |

(52) U.S. Cl.
CPC .......... *A47G 1/1653* (2013.01); *A47B 43/006* (2013.01); *A47B 96/1425* (2013.01); *A47G 29/08* (2013.01); *F16B 2/12* (2013.01)

(58) Field of Classification Search
CPC .. A47G 1/1653; A47G 25/06; A47G 25/0614; A47G 25/065; A47G 25/0685; A47G 25/1478; A47G 25/746; A47G 1/16; A47G 29/08; F16B 2/12; A47B 43/003; A47B 43/006; A47B 96/16; A47B 96/1416; A47B 96/1425; A47F 7/143; A47F 5/0884

USPC ............ 211/45, 119.009, 119.004, 113, 124, 211/89.01, 119.11, 119.12, 119.13; 248/489, 493, 251, 304, 317, 339, 340

See application file for complete search history.

(56) References Cited

U.S. PATENT DOCUMENTS

| | | | | |
|---|---|---|---|---|
| 1,980,730 A | * | 11/1934 | Matchette | A47B 96/16 211/119.004 |
| 2,206,753 A | * | 7/1940 | Roth | A47B 43/006 108/164 |
| 2,270,796 A | * | 1/1942 | Hauser | A47G 25/08 211/119.004 |
| 2,483,043 A | * | 9/1949 | Golden | B60N 3/004 108/134 |
| 2,925,916 A | * | 2/1960 | Pollock | A47B 61/02 211/119.004 |
| 3,188,028 A | * | 6/1965 | Waller | A47G 1/215 248/316.8 |

(Continued)

*Primary Examiner* — Jennifer E. Novosad
(74) *Attorney, Agent, or Firm* — Tucker Ellis LLP; Carlos Garritano; Evan Perry

(57) ABSTRACT

A gallery device is described that can be mounted over a door for showcasing or organizing various items. The gallery device includes at least two vertically arranged cords that are substantially parallel to each other. The gallery device additionally includes one or more horizontal cords, extending between the vertical cords, that provide points of attachment for the various items. The horizontal cords are vertically adjustable along the vertical cords to accommodate different sized items.

16 Claims, 7 Drawing Sheets

(56) References Cited

U.S. PATENT DOCUMENTS

| | | | | |
|---|---|---|---|---|
| 3,343,683 A * | 9/1967 | Wheeler | A47F 7/10 | 211/105.2 |
| 3,355,030 A * | 11/1967 | Cathcart | A47K 10/10 | 182/196 |
| 3,888,448 A * | 6/1975 | Rowland | A61M 5/1415 | 24/129 R |
| 3,901,165 A * | 8/1975 | Schlesinger | A47B 43/006 | 108/149 |
| 3,990,665 A * | 11/1976 | Joussemet | A47B 43/006 | 248/243 |
| 4,052,805 A * | 10/1977 | Potter | G09F 1/10 | 211/118 |
| 4,365,778 A * | 12/1982 | Joussemet | A47B 43/006 | 248/250 |
| 4,589,351 A * | 5/1986 | Love | A47B 43/006 | 108/105 |
| 4,660,750 A * | 4/1987 | Blanchard | A47G 25/485 | 211/124 |
| 4,736,855 A * | 4/1988 | Arakawa | A47B 43/006 | 108/149 |
| 4,802,265 A * | 2/1989 | Stevenson | A47G 25/485 | 211/119.13 |
| 4,846,430 A * | 7/1989 | Ke | A47G 25/00 | 248/215 |
| 5,052,648 A * | 10/1991 | Landau | A47B 43/006 | 108/149 |
| 5,058,847 A * | 10/1991 | Arakawa | A47B 43/006 | 248/243 |
| 5,176,266 A * | 1/1993 | Gillet | A47B 43/006 | 108/106 |
| 5,542,530 A * | 8/1996 | Freelander | A47B 43/003 | 108/106 |
| 5,810,457 A * | 9/1998 | Felsenthal | A47B 43/006 | 108/106 |
| 5,950,844 A * | 9/1999 | Taylor | A47B 43/00 | 211/118 |
| 6,212,810 B1 * | 4/2001 | Jones | G09F 15/0037 | 160/135 |
| 6,595,145 B1 * | 7/2003 | Lietz | A47B 43/006 | 108/106 |
| 6,722,511 B1 * | 4/2004 | Lowe | A47F 5/0838 | 211/119.004 |
| 6,814,418 B2 * | 11/2004 | D'Orso | A47B 61/04 | 108/149 |
| 7,178,769 B2 * | 2/2007 | Magnusson | A47B 96/1416 | 211/119.004 |
| 7,624,479 B1 * | 12/2009 | Lin | A47B 43/006 | 24/135 N |
| 7,958,925 B2 * | 6/2011 | Murray | E06B 3/485 | 160/127 |
| 8,020,712 B2 * | 9/2011 | Kopp | A42B 1/002 | 211/118 |
| 8,342,470 B2 * | 1/2013 | Shortell | A01G 5/04 | 211/119.004 |
| 8,413,398 B1 * | 4/2013 | Allred | F16G 11/06 | 248/181.1 |
| 8,480,047 B2 * | 7/2013 | Sloan | A47B 43/003 | 211/90.01 |
| 8,967,398 B2 * | 3/2015 | McLemore | E06B 3/34 | 211/113 |
| 9,060,603 B1 * | 6/2015 | Christie | A47B 73/002 | |
| 9,370,268 B2 * | 6/2016 | Van Groesen | A47G 1/1686 | |
| 9,541,112 B1 * | 1/2017 | Weston | A47G 1/1633 | |
| 9,706,836 B1 * | 7/2017 | Nelson | A47B 57/06 | |
| 2002/0190017 A1 * | 12/2002 | Stevens | A47B 43/006 | 211/118 |
| 2003/0035294 A1 * | 2/2003 | Szilagyi | A47B 43/006 | 362/407 |
| 2003/0164347 A1 * | 9/2003 | Bouvier, Jr. | A47B 43/006 | 211/117 |
| 2004/0118791 A1 * | 6/2004 | Rimback | A47F 7/08 | 211/34 |
| 2006/0049124 A1 * | 3/2006 | Wang | A47B 43/003 | 211/113 |
| 2006/0186071 A1 * | 8/2006 | Rowan | A47B 43/006 | 211/113 |
| 2006/0207956 A1 * | 9/2006 | Sivers | A47G 29/00 | 211/113 |
| 2010/0270246 A1 * | 10/2010 | Rodriguez | A47B 96/16 | 211/34 |
| 2011/0024376 A1 * | 2/2011 | Hendricks | A01G 5/04 | 211/119.004 |
| 2011/0298346 A1 * | 12/2011 | Stone | A47B 43/006 | 312/247 |
| 2013/0082017 A1 * | 4/2013 | Tang | A47H 1/02 | 211/124 |
| 2013/0220957 A1 * | 8/2013 | Malik | A47B 57/04 | 211/119.004 |
| 2017/0086577 A1 * | 3/2017 | Mahugo-Lopez | A47B 43/006 | |

\* cited by examiner

ADJUSTABLE AND MOUNTABLE GALLERY DEVICE

CROSS-REFERENCE TO RELATED APPLICATION(S)

This application claims the benefit of and priority to U.S. Provisional Application Ser. No. 62/516,944, filed on Jun. 8, 2017. The entirety of the aforementioned application, including related appendices filed therewith, is incorporated herein by reference.

BACKGROUND OF THE INVENTION

1. Field of the Invention

This application relates generally to a gallery device and, more particularly, to a vertically-mountable apparatus for supporting various items.

2. Description of Related Art

Conventional home décor options to display items include frames for a hanging on walls, leaning against walls, or standing on table surfaces. Alternatively, the items themselves may be affixed to a wall or surface via various attachment means (i.e., nails, tacks, hooks, magnets, adhesive, tape, or other sticky substances). Additionally, organizational solutions having pockets, rods, hooks, cords, etc. can be also be attached to walls or other surfaces for storage of items such as, documents, shoes, hats, bags, towels, or the like. Like the home décor options (e.g., for artwork or papers items), these organizational solutions can also affix to surfaces via nails, hooks, adhesives, tapes, or the like.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a gallery device, mountable to a surface, provides support to showcase or organize various items. For instance, the gallery device can be mounted over a door, or to a wall surface, to enable displaying or storing items relative to an underutilized surface area. In one configuration, the gallery device includes at least two vertically arranged supports that are substantially parallel to each other. Further, the gallery device includes one or more horizontal spans or rungs, extending between the vertical supports, that provide points of attachment for the various items. The horizontal spans are vertically adjustable along the vertical supports to accommodate different sized items.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

Figure 1:
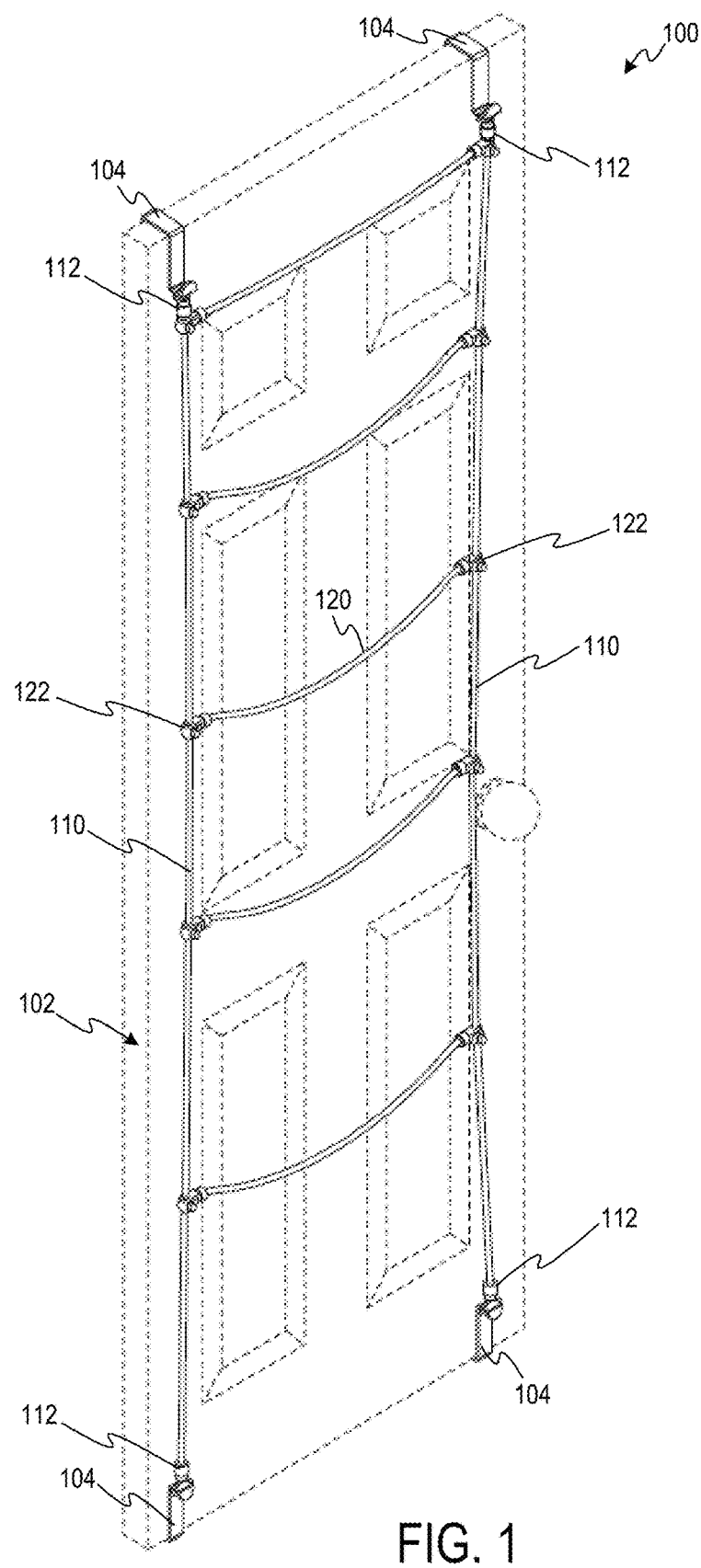
FIG. 1 illustrates an exemplary, non-limiting embodiment of a gallery apparatus according to one or more aspects.

Embodiments of the invention relate to a gallery apparatus which hangs over a door, on a wall, or on any surface in a removable, non-damaging manner. The gallery apparatus generally includes at least two main supports extending vertically (e.g. generally top-to-bottom with respect to the door or surface) and substantially parallel to one another. The main supports can attach to the door or surface via hooks. The hooks can be over-the-door mounted hooks or affixed to the door or surface via other means (e.g., adhesive strips, suction cups, or other non-damaging, non-permanent attachments).

The gallery apparatus further includes at least one item support that extends horizontally between, and in a direction transverse to, the main supports. The item support is adjustably movable vertically along the main supports. The item support, according to an example, provides an attachment point for various items such as, but not limited to, artwork, photos, mail, memos, paper ephemera, and the like. For instance, such items can be coupled to the item support via a clothespin, a hook, a clip, a spring clip (e.g. carabiner or the like), a snap hook, or substantially any other detachable linking means capable of coupling to both the item support and the item.

According to an aspect, the main supports and the item support are shock or bungee cords to provide versatility in mounting the gallery apparatus to variously sized doors or surfaces. The shock cords can be provided with terminal ends to facilitate attachments. For instance, the item supports can carry terminal ends to couple to the cords comprising the main supports. The main supports, in turn, can carry terminal ends to facilitate attachment to a hook or clip associated with the door or surface. In accordance with another example, the main supports can be rods having one or more through-holes placed along the respective lengths. The item support can be a barbed-end shock cord that can be threaded through the holes in the rods. By threading through different pairs of holes (i.e. one on each main support rod), the height of the item support can be adjusted.

According to one embodiment, a gallery apparatus is provided. The gallery apparatus includes a pair of main supports extending in a first direction with respect to a surface. Each main support can include first and second main support terminal ends that respectively couple to surface attachments associated with the surface so as to mount the pair of main support to the surface. The gallery apparatus can further include at least one item support extending in a second direction with respect to the surface and between the pair of main supports. The at least one item support includes opposed ends respectively having item support terminal ends for coupling the at least one item support to the pair of main supports. The second direction is transverse to the first direction. The at least one item support is configured to provide an attachment point to support an item for display.

According to various examples, the first direction is vertical and the second direction is horizontal. The surface is a door and the surface attachments comprise over-the-door hooks. The main support terminal end can include a neck portion defining a channel configured to receive a terminal end of a main support cord and a loop portion configured to engage the surface attachment associated with the surface. The main support terminal end can further include a sleeve configured to slide over the neck portion and secure the terminal end of the main support cord within the channel. The item support terminal end can include a cord stop having an aperture and a button having an opening and coupled to a spring. Compression of the spring via application of a force on the button aligns the aperture and the opening so as to enable a main support cord to pass through. The spring secures the item support terminal end to a selected position on the main support cord of the main support. The item support terminal end a neck portion defining a channel configured to receive a terminal end of an item support cord forming the item support and a sleeve configured to slide over the neck portion and secure the terminal end of the item support cord within the channel. The neck portion and the cord stop are integrally formed as a monolithic piece. The aperture of the cord stop and the channel are orthogonally arranged with respect to each other.

In another embodiment, an apparatus is provided that includes at least two main supports extending in a first direction where each main support having first and second main support terminal ends that respectively couple to mount points on a surface. The apparatus further includes at least one item support extending between the at least two main supports in a second direction transverse to the first direction. The at least one item support has opposed ends each carrying an adjustable mount for coupling the at least one item support to one of the at least two main supports.

According to various examples, the adjustable mount includes a first channel configured to receive the main support and a second channel configured to receive the item support. The first and second channels are orthogonally arranged with respect to each other. The first channel is an aperture and the main support passes fully through the aperture. The adjustable mount includes compression means for securing the adjustable mount at a selected position along the main support. The compression means is selectively engageable so as to adjust a position along the main support where the adjustable mount is secured. The at least one item support is configured to provide an attachment point to support an item for display. The at least two main supports and the at least one item support can be bungee cords. The mount points for the first and second terminal ends comprise over-the-door hooks.

In yet another embodiment, a gallery apparatus mountable to a door is provided. The gallery apparatus includes a pair of main support cords extending vertically with respect to the door. The gallery apparatus further includes a set of main support terminal ends disposed on terminal ends of the main support cords. The gallery apparatus further includes a set of over-the-door hooks configured to respectively engaged with the set of main support terminal ends to mount the main support cords to the door. The gallery apparatus can also include a plurality of item support cords extending horizontally between the pair of main supports cords. The gallery apparatus can further include a plurality of item support terminal ends respectively disposed on terminal ends of the plurality of item support cords. The plurality of item support terminal ends are adjustably secured to the main support cords at various vertical positions. In addition, the gallery apparatus can include a plurality of clips selectably engageable with the plurality of item supports to support items for display by the gallery apparatus.

The above noted features and embodiments will be described with reference to the drawings, wherein like reference numerals are used to refer to like elements throughout.

Turning initially to FIG. 1, illustrated is a gallery apparatus 100 mountable to a door or surface 102 via surface attachments 104. Surface attachments 140 may include hooks, hangers, suction cups, adhesives, pegs, or other devices suitable to couple the gallery apparatus 100 to a door, wall, or other surface. According to the non-limiting embodiment depicted in FIG. 1, surface attachments 104 include over-the-door attachments to mount the gallery apparatus 100 to a door 102.

Gallery apparatus 100 includes two or more main supports 110, which can be non-rigid (e.g. cords or ropes) or rigid (e.g. rods, sticks, poles, dowels, etc.). Each of main supports 110 extends in a vertical direction with respect to door or surface 102. The main supports 110 are substantially parallel to each other as shown in FIG. 1. A main support terminal end device 112 (also referred to as main support terminal end 112) is disposed on each end of each main support 110. The main support terminal end 112, in one example, can be a hook, ring, or loop that couples with surface attachments 104 mounted on the surface 102 so as to attach the main supports 110 to the surface 102.

As shown in FIG. 1, the gallery apparatus 100 can include four surface attachments 104, in particular, a top pair and a bottom pair. The top pair can be mounted at a higher position on surface 102 (or a top portion of a door 102) and the bottom pair is mounted at a lower position on surface 102 (or a a bottom portion of the door). Each main support 110, via main support terminal ends 112, couples to one surface attachment 104 of the top pair and one surface attachment 104 from the bottom pair.

In one embodiment, particularly the over-the-door embodiment, main support 110 are made from an elastic material. Accordingly, the elastic material of main support 110, when attached to surface attachment 104, operates to compress the bottom surface attachment 104 against a bottom surface of the door 102. Thus, the surface attachment 104 need not be permanently affixed to surface 102 or otherwise attached via surface altering means.

The gallery apparatus 100 includes one or more item supports 120, which extend horizontally between and in a direction transverse to main supports 110. The item support 120, on each end thereof, couples to main support 110 via item support terminal ends 122. The item support terminal ends 122, for example, can be an eyelet, a ring, a loop, a clip, etc. The item support 120 is movable vertically along main supports 110 to be positioned at various heights.

Figure 2:
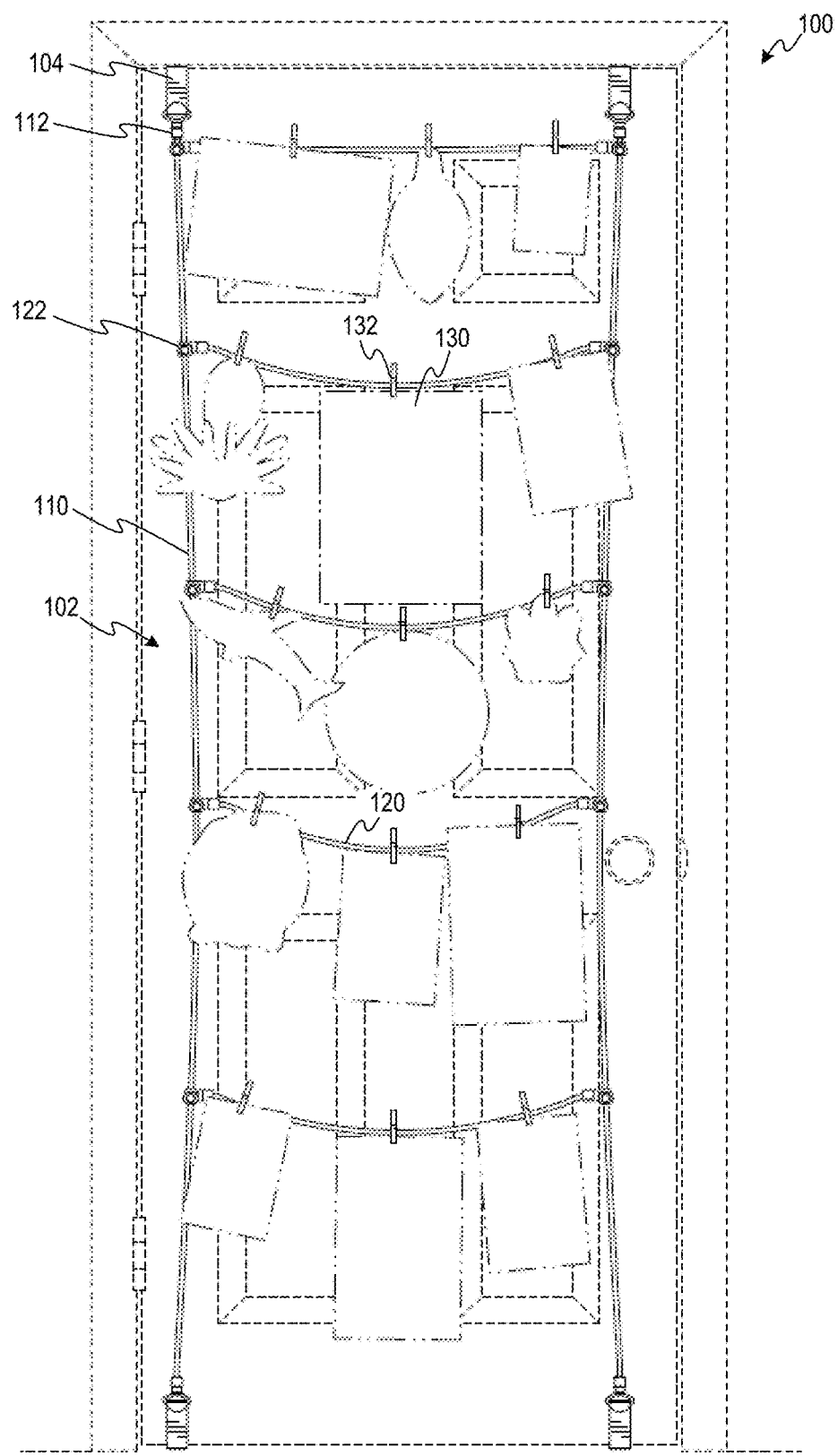
FIG. 2 illustrates an exemplary, non-limiting embodiment of a gallery apparatus displaying various items in accordance with an aspect.

Turning briefly to FIG. 2, the item support 120 provides attachment points for various items. For instance, an item 130 can be mounted on gallery apparatus 100 via a fastener 132 that engages at a position along the horizontal span of item support 120. The fastener 132 can be a clothespin, a hook, a clip, a spring clip (e.g. carabiner or the like), a snap hook, or substantially any other detachable linking means capable of coupling to both the item support 120 and the item 130.

Figure 3:
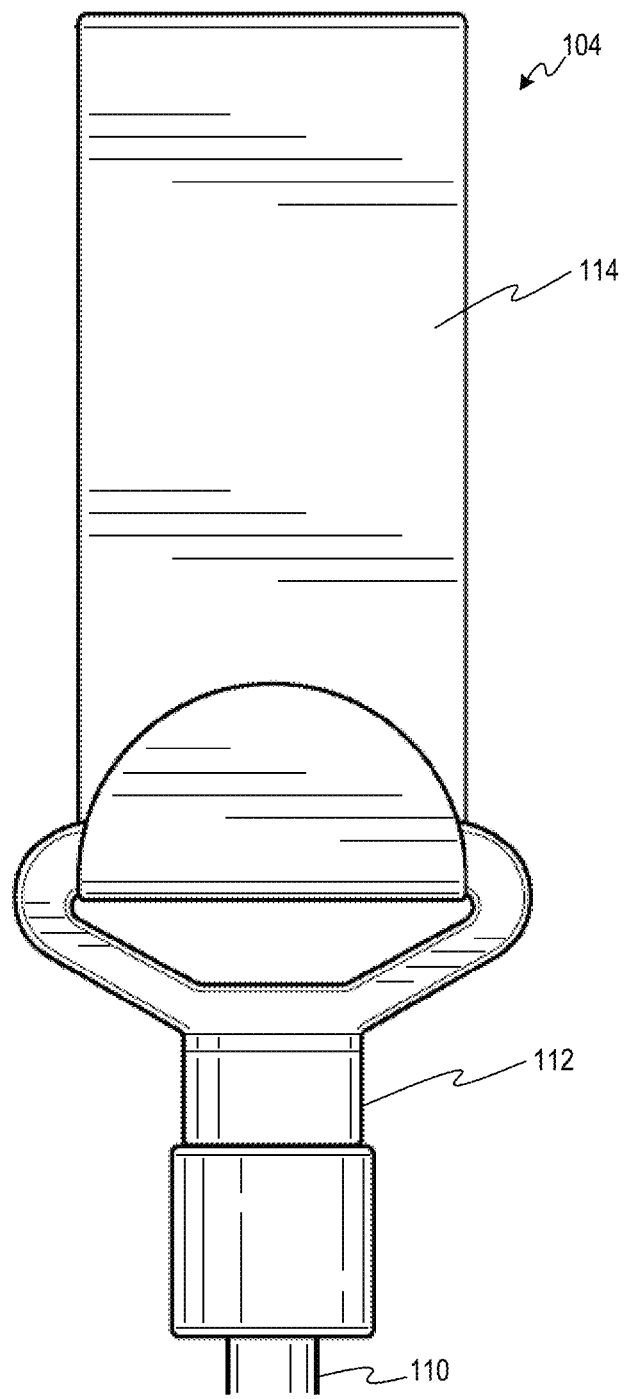
FIG. 3 illustrates an exemplary, non-limiting embodiment of an over-the-door mount for the gallery apparatus of FIG. 1.

Turning to FIG. 3, illustrated is an exemplary embodiment of surface attachment 104. In particular, as shown in FIG. 3, the surface attachment 104 may be an over-the-door mount for the gallery apparatus 100. As shown in FIG. 3, main support 110 (a bungee or shock cord, for example) carries a main support terminal end 112, which interfaces with a hook 114 mounted over an edge of door (not shown).

Figure 4:
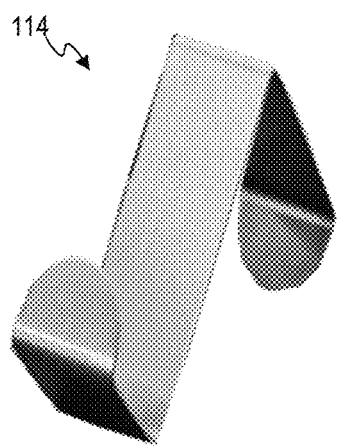
FIG. 4 illustrates an exemplary, non-limiting embodiment of a hook for the over-the-door mount shown in FIG. 3.
Figure 5:
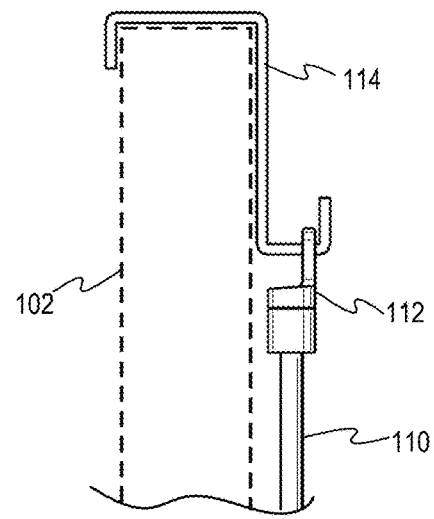
FIG. 5 illustrates an exemplary, non-limiting embodiment of the hook in FIG. 4 as mounted on a surface.

FIGS. 4 and 5 illustrate an exemplary structure of hook 114, which is capable of being carried on a door 102. As shown, hook 104 can be approximately S-shaped and has hook portions (or serifs) on opposed ends. As shown in FIG. 5, one hook portion can interface with main support terminal end 112 and another hook portion can wrap around an end of the door 102. As mentioned above, main support 110 may be an bungee cord or otherwise made from an elastic material. When the main support terminal 112 is coupled to hook 114, the elasticity of main support 110 operates to compress and hold hook 114 against the end of the door 102. In particular, the elasticity of main support 110 may secure hook 114 to a bottom end of door 102 against the force of gravity.

Figure 6:
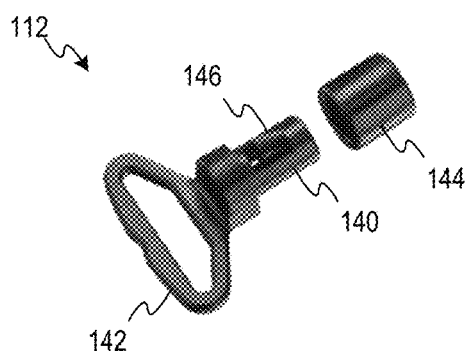
FIG. 6 illustrates an exemplary, non-limiting embodiment of a terminal end associated with the over-the-door mount of FIG. 3.
Figure 7:
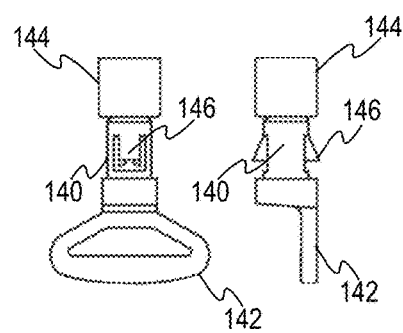
FIG. 7 illustrates an exemplary, non-limiting embodiment of a terminal end associated with the over-the-door mount of FIG. 3.

FIGS. 6 and 7 illustrate an exemplary main support terminal end 112 that cooperates with surface attachment 104 or hook 114 to mount and support the gallery apparatus 100 on surface 102. The main support terminal end 112 includes a neck portion 140 defining a channel configured to accept an end portion of a cord (e.g., a bungee or shock cord) therein. A sleeve 144 slides over an neck portion 140 to secure the cord within the channel of neck portion 140. More particularly, the neck portion 140 includes tabs 146, which are compressed against the cord (e.g. main support 110) located in the channel by the sleeve 144. The tabs 146 may have some resiliency and exert a bias force against an inner surface of sleeve 144. Accordingly, the tabs 146 are pushed against a cord in the channel and also push against the sleeve 144 to secure the components together with friction. The main support terminal end 112, as shown, further includes a loop portion 142 configured to secure to a hook or other protrusion, for example on surface attachment 104 or hook 114.

Figure 8:
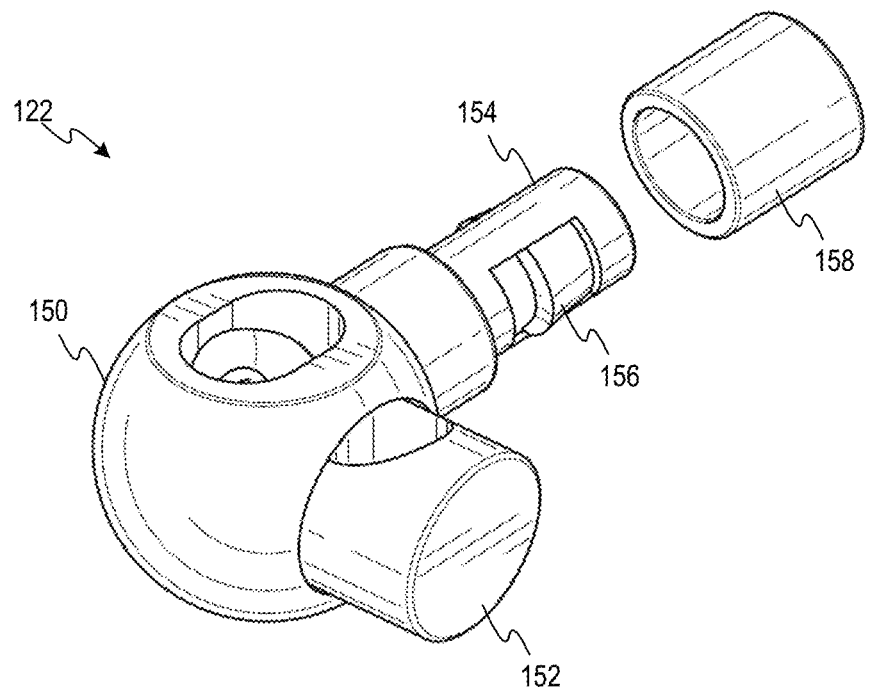
FIG. 8 illustrates an exemplary, non-limiting embodiment of a terminal end for horizontal spans of the gallery apparatus of FIG. 1.
Figure 9:
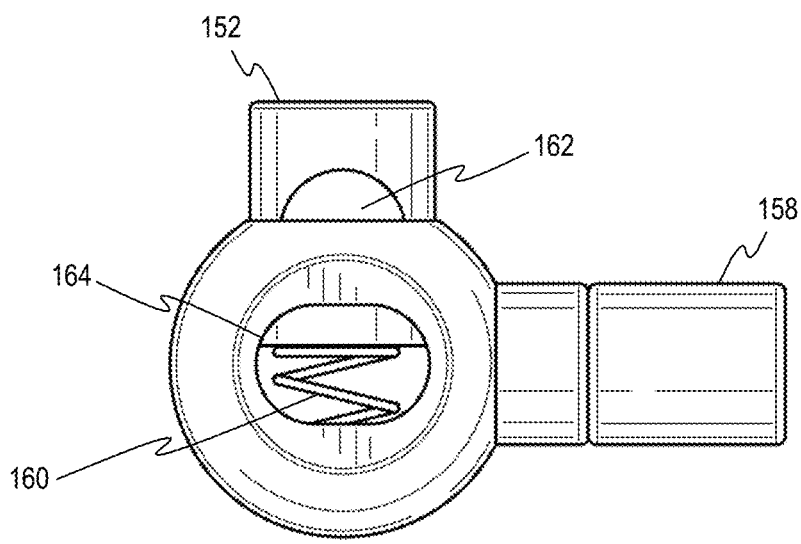
FIG. 9 illustrates an exemplary, non-limiting embodiment of a terminal end for horizontal spans of the gallery apparatus of FIG. 1.

Turning now to FIGS. 8 and 9, illustrated in an exemplary, non-limiting embodiment of an item support terminal end 122. As shown in FIGS. 8 and 9, the item support terminal end 122 is configured to couple to at least two bungee cords arranged substantially orthogonal to each other. Thus, the item support terminal end 122 creates a T-joint between two cords. As described above, item support terminal end 122 couples item support 120 to main support 110. Similar to main support terminal end 112, item support terminal end 122 includes a neck portion 154 that defines a channel configured to receive a cord (i.e. an end portion of item support 120) and a sleeve 158 that engages over the neck portion 154 to compress tabs 156 against the cord. Item support terminal end 122 further includes a cord stop 150 that includes a button 152 to facilitate movement of item support terminal end 122 along a support, such as main support 110. The cord stop 150 includes a spring 160 coupled to button 152. Spring 160 maintains button 152 in a protruded position as shown unless a force is applied to the button 152 to cause compression of the spring 160. Upon compression of the spring 160, an opening 162 of button 152 aligns with an central aperture 164 of cord stop 150. Upon alignment of opening 162 and aperture 164, an end portion of a cord (e.g. main support 110) can be threaded through the aligned openings. Upon release of the button 152, spring 160 extends to compress the threaded cord against inner walls of the opening 162 and aperture 164, thus securing the cord stop 150 (and item support 120 coupled thereto) to the main support 110.

As shown in FIGS. 8 and 9, the neck portion 154 may be integrally formed with cord stop 150 such that item support terminal end 122 is a monolithic piece. Thus, in one embodiment, item support terminal end 122 is a single component that couples to both main support 110 and item support 120.

Figure 10:
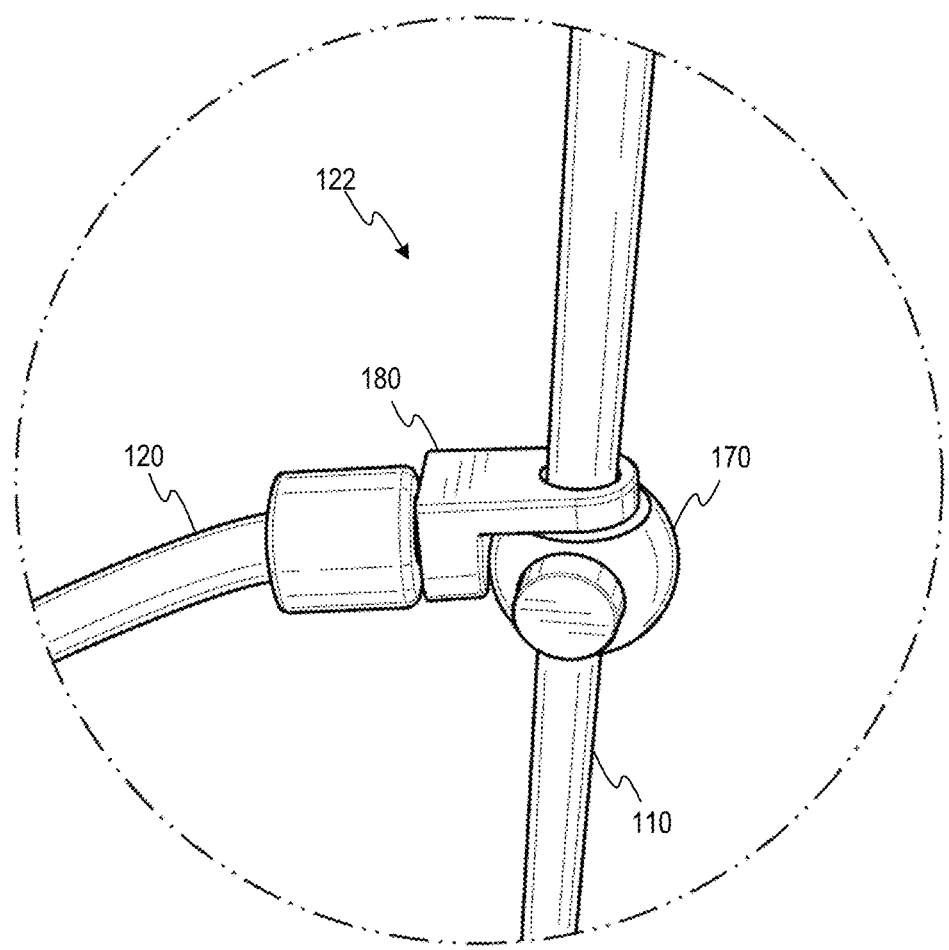
FIG. 10 illustrates an exemplary, non-limiting embodiment of a terminal end for horizontal spans of the gallery apparatus of FIG. 1.

FIGS. 10-13 illustrate another embodiment of item support terminal end 122, which includes separated components. In particular, as shown in FIG. 10, a cord stop 170 is attached to main support 110 and the item support 120 carries an eyelet end 180. The main support 110 can be threaded through the eyelet end 180 so as to be supported at a desired height by cord stop 170.

Figure 11:
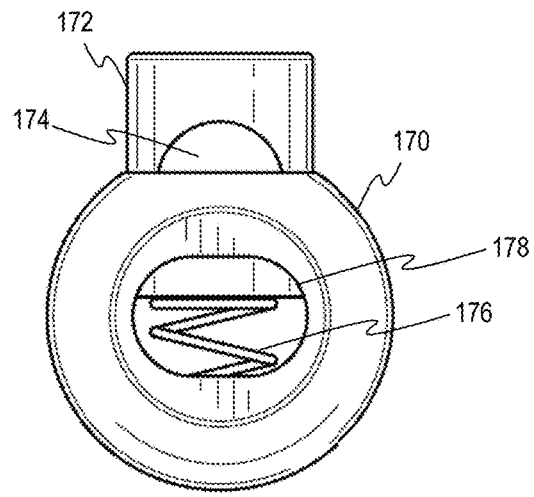
FIG. 11 illustrates an exemplary, non-limiting embodiment of a stop associated with the terminal end of FIG. 10.

Turning to FIG. 11, an exemplary, non-limiting embodiment of cord stop 170 is illustrated. The cord stop 170 includes a spring 176 coupled to a button 172. Spring 176 maintains button 172 in a protruded position as shown unless a force is applied to the button 172 to cause compression of the spring 176. Upon compression of the spring 176, an opening 174 of button 172 aligns with an central aperture 178 of cord stop 170. Upon alignment of opening 174 and aperture 178, an end portion of a cord (e.g. main support 110) can be threaded through the aligned openings. Upon release of the button 172, spring 176 extends to compress the threaded cord against inner walls of the opening 174 and aperture 178, thus securing the cord stop 170 to cord (e.g., the main support 110).

Figure 12:
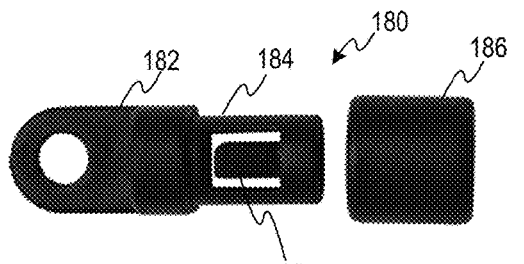
FIG. 12 illustrates an exemplary, non-limiting embodiment of an attachment that cooperates with the stop of FIG. 11.
Figure 12:
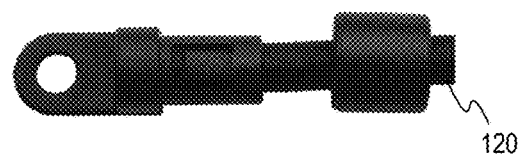
Figure 13:
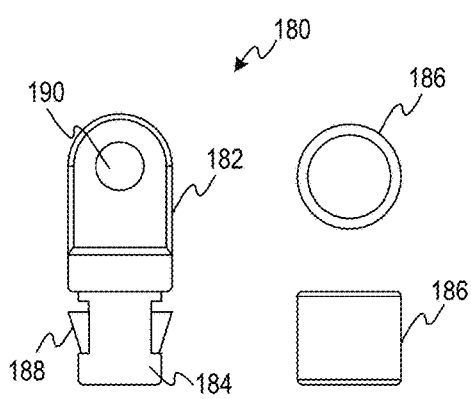
FIG. 13 illustrates an exemplary, non-limiting embodiment of an attachment that cooperates with the stop of FIG. 11.

In FIGS. 12 and 13, an exemplary, non-limiting embodiment of the eyelet end 180 is depicted. As shown, eyelet end 180 includes an eyelet portion 182 and a neck portion 184. The neck portion 184 defines a channel configure to receive an end of a cord (e.g. item support 120). The eyelet end 180 further includes a sleeve 186 configured to slide over the neck portion 184. When slid over the neck portion 184, the sleeve 186 engages tabs 188 of the neck portion 184 to push the tabs against a cord in the channel, thereby securing the eyelet end 180 to the cord. The eyelet end 182 includes an opening 190 through which another cord may pass. For instance, as shown in FIG. 10, the main support 110 may be threaded through opening 190.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A gallery apparatus, comprising:
a pair of main supports extending in a first direction with respect to a surface, each main support having a main support cord terminated by first and second main support terminal ends that respectively couple to surface attachments associated with the surface so as to mount the pair of main supports to the surface; and
at least one item support extending in a second direction with respect to the surface and between the pair of main supports, the at least one item support having opposed ends respectively having item support terminal ends for coupling the at least one item support to the pair of main supports,
wherein the second direction is transverse to the first direction,
wherein the at least one item support is configured to provide an attachment point to support an item for display, and
wherein each item support terminal end of the at least one item support comprises:
a cord stop having an aperture;
a button having an opening and coupled to a spring, wherein compression of the spring via application of a force on the button aligns the aperture and the opening so as to enable the main support cord of one of the pair of main supports to pass through;
a neck portion defining a channel configured to receive a terminal end of an item support cord forming the item support; and
a sleeve configured to slide over the neck portion and secure the terminal end of the item support cord within the channel.

2. The gallery apparatus of claim 1, wherein the first direction is vertical and the second direction is horizontal.

3. The gallery apparatus of claim 1, wherein the surface comprises a door and the surface attachments comprise over-the-door hooks.

4. The gallery apparatus of claim 1, wherein the first and second main support terminal ends of each of the pair of main supports respectively comprise:
a neck portion defining a channel configured to receive a respective terminal end of a respective main support cord; and
a loop portion configured to engage the surface attachment associated with the surface.

5. The gallery apparatus of claim 4, wherein the first and second main support terminal ends further include a sleeve configured to slide over the neck portion and secure the terminal end of the main support cord within the channel.

6. The gallery apparatus of claim 1, wherein the spring secures the item support terminal end to a selected position on the main support cord of the main support.

7. The gallery device of claim 1, wherein the neck portion and the cord stop are integrally formed as a monolithic piece.

8. The gallery device of claim 1, wherein the aperture of the cord stop and the channel are orthogonally arranged with respect to each other.

9. An apparatus, comprising:
at least two main supports extending in a first direction, each main support having first and second main support terminal ends that respectively couple to mount points on a surface; and
at least one item support extending between the at least two main supports in a second direction transverse to the first direction, the at least one item support having opposed ends each carrying an adjustable mount for coupling the at least one item support to one of the at least two main supports, wherein the at least one item support is configured to provide an attachment point for one or more clips selectably engageable with the at least one item support to support an item for display,
wherein the at least two main supports and the at least one item support comprise bungee cords.

10. The apparatus of claim 9, wherein the adjustable mount includes a first channel configured to receive the main support and a second channel configured to receive the item support.

11. The apparatus of claim 10, wherein the first and second channels are orthogonally arranged with respect to each other.

12. The apparatus of claim 10, wherein the first channel is an aperture and wherein the main support passes fully through the aperture.

13. The apparatus of claim 12, wherein the adjustable mount includes compression means for securing the adjustable mount at a selected position along the main support.

14. The apparatus of claim 13, wherein the compression means is selectively engageable so as to adjust a position along the main support where the adjustable mount is secured.

15. The apparatus of claim 9, wherein the mount points for the first and second terminal ends comprise over-the-door hooks.

16. A gallery apparatus mountable to a door, comprising:
a pair of main support cords extending vertically with respect to the door;
a set of main support terminal ends disposed on terminal ends of the main support cords;
a set of over-the-door hooks configured to respectively engage with the set of main support terminal ends to mount the main support cords to the door;
a plurality of item support cords extending horizontally between the pair of main supports cords;
a plurality of item support terminal ends respectively disposed on terminal ends of the plurality of item support cords, wherein the plurality of item support terminal ends are adjustably secured to the main support cords at various vertical positions; and
a plurality of clips selectably engageable with the plurality of item supports to support items for display by the gallery apparatus, wherein the main support cords and the item support cords comprise bungee cords.

* * * * *